3,428,477
PROCESS OF STABILIZING PARTICLEBOARD SURFACES BY TREATMENT WITH WATER SOLUTIONS OF CURABLE RESINS
Earland G. Hallonquist, Nanaimo, British Columbia, and Manfred M. Honnige, Cedar, British Columbia, Canada, assignors to MacMillan Bloedel Limited, a corporation of British Columbia
No Drawing. Filed Dec. 21, 1964, Ser. No. 420,152
U.S. Cl. 117—65.2                              14 Claims
Int. Cl. B44d *1/46, 1/12*

ABSTRACT OF THE DISCLOSURE

The process of stabilizing the surface of particleboard by applying to said surface a water solution of water dilutable, heat-curable phenolic resin having a low degree of advancement or polymerization to cause raising of said particles, and curing said resin to stabilize the raised particle.

---

This invention relates to processes of stabilizing the surfaces of particleboards.

An object of the present invention is the provision of a process of stabilizing the surfaces of particleboards against varying atmospheric conditions.

The term "particleboard" is intended to cover any board or panel comprising particles of wood bonded together by heat and pressure in conjunction with synthetic resins or other added binder in which the primary bond is achieved by the bonding agent, said wood particles being in the form of granules, slivers, shavings, flakes and the like.

Heretofore it has not been practical to use particleboard and particularly phenolic bonded particleboard outside where it is exposed to varying atmospheric conditions. The reason for this is that even when the particleboard is painted, after only short exposures to the weather, the surface begins to roughen due to the swelling and/or expansion of the surface wood particles or flakes. Since this deterioration usually takes place over a period of time and to a greater or lesser extent depending upon the degree of exposure to wind, sun and rain, it soon results in an uneven and unsightly surface appearance. In addition to this, the effects of swelling and shrinking under moisture and drying conditions tend to hasten the break down of the bonding resin of the particleboard and therefore increase erosion of the surface wood particles.

This problem of non-uniform surface swelling and erosion of the surface wood particles can be reduced in accordance with the present invention to a minimum by treating the surface of the particleboard with a water dilutable, heat-curable phenolic resin, having a low degree of advancement or polymerization, such as is used in the impregnation of paper, for example, in the manufacture of paper overlay of a type commonly known as medium density overlay, by the method of sheet impregnation. In addition to this, the resin used is in solution in water, and the treatment of the particleboard with the aqueous resin brings about a uniform raising of the surface particles or flakes to a degree dependent on the amount of solution applied and the pH of the solution. By increasing the alkalinity of the solution, you increase the speed and depth of penetration into the panel surfaces. When this resin is subsequently cured, the particle raising is stabilized against further change, giving an attractive "stucco" effect to the surface when painted. In addition to this, the particle raising effectively masks any minor swelling or particle raising that may occur. If desired, the board can be hot pressed to provide a smooth surface. In the process of swelling, the raised particles absorb more resin than would otherwide be the case, the resin gets into the interstices between the particles, so that when the board is hot pressed the resin and surface particles form a dense moisture-resistant surface. The resin used is one that has a low degree of polymerization in order that it will readily penetrate and swell the surface particles or flakes, and then can be finally cured to stabilize the particles or flakes in this new condition. The resin is something of the order of one having a viscosity of about 12 to 30 centipoises at 50% concentration at 25° C. This is the general condition of the resin indicated by the expression "resin having a low degree of polymerization" used herein and in the accompanying claims.

Another advantage of this process is that the raising of the surface particles of the particleboard panel can be controlled to a certain extent as to the time required and the degree of raising of the surface particles. The extent to which raising of the surface particles occurs depends on a number of factors, including the surface condition of the particleboard, the amount of resinous solution applied, the percent of water present and pH of the solution, and to some extent to the resin itself or possible additives present in the resin.

The following resins, designated A, B and C for convenience have been used in the production of stabilized particleboard:

Resin A.—A phenol-formaldehyde impregnating resin having the following properties:

| | | |
|---|---|---|
| Solids content _____percent__ | About | 50 |
| Specific gravity _____ | About | 1.6 |
| Viscosity @ 25° C. _____centipoises__ | About | 25 |
| pH _____ | | 8.0–8.2 |
| Water diluteability _____percent__ | Over | 1000 |

Resin B.—An alcohol-borne phenol-formaldehyde impregnating resin having the following properties:

| | | |
|---|---|---|
| Solids content _____percent__ | About | 66 |
| Specific gravity _____ | About | 1.14 |
| Viscosity @ 25° C.: | | |
| (66% solids) _____centipoises__ | About | 300 |
| (50% solids) _____do____ | About | 30 |

Diluted With Water

| | | |
|---|---|---|
| pH _____ | Around | 9.0 |
| Water diluteability @ 25° C. __percent__ | Around | 200 |

Resin C.—A phenol-formaldehyde impregnating resin having the following properties:

| | | |
|---|---|---|
| Solids content _____percent__ | About | 67 |
| Specific gravity _____ | About | 1.2 |
| Viscosity @ 25° C.: | | |
| (67% solids) _____centipoises__ | About | 125 |
| (50% solids) _____do____ | About | 12 |

Diluted With Water

| | | |
|---|---|---|
| pH _____ | Around | 7.8 |
| Water diluteability @ 25° C. __percent__ | Over | 2000 |

Resin A, when used, produced only light to medium particles raising unless either flooded on the surface and allowed to stand, or the pH raised to 9.0–9.5. Resin C produced no particle raising when applied at its high solids level, but produced very heavy particle raising when diluted with water to 45% solids. When employing a high pH resin to promote particle raising, the pH should not be above 9.5, since higher pH levels have been found to promote loosening of the surface particles and increased erosion on weathering.

The amount of resin used is that which will give the desired degree of stability on weathering. This depends to some extent on the amount of resin used in the board and the dimensions and shape of the flakes or particles present in the surface of the board. Excellent results have been obtained with a particleboard made from refined cedar waste (shingle-hay, sawdust) and 4.0% phenolic resin by treating the surface with 24 grams per sq. ft. (52–53 lbs. per 1000 sq. ft.) of a 40% solution of phenolic impregnating resin in water (sp. gr. 1.18). This amount represents roughly the minimum quantity that can be conveniently brushed onto the surface. The use of larger amounts of resin solution will help in promoting grain raise, but does not appear to improve stability to any marked degree.

The resin solution, or pigmented resin mixture may be applied in any convenient manner, for example, by brush, spray or coater, and may be applied to a cold panel or to a panel preheated to any convenient temperatures (generally 175–225° F.) which will promote penetration of the resin into the board and speed up initial drying. After the resin has been applied and sufficient time given for particle-raising to take place, if this is desired (generally 2–5 minutes, but may be longer, for example 10–20 minutes, with a flood coat of a resin that does not readily promote particle raise), the treated panel is dried and then sent to a curing oven to complete the cure of the resin. If a second coat of resin is to be applied, which may, for example, contain pigment, this is done after the initial drying and, after redrying, the resin in both coats cured at once. A single coat of unpigmented resin may be dried and cured in a single step, providing the amount of moisture present will not cause blistering or other undesirable effect. With pigmented coatings it has been found essential to pre-dry to avoid formation of bubbles or blisters.

Drying may be carried out under any convenient conditions, providing they do not lead to formation of bubbles or blisters. It has been found that 10 minutes at 225–250° F. works well under most conditions, but satisfactory results are obtained by air-drying overnight or for an equivalent time.

The time and temperature required for cure will depend on the properties of the resin used. Too little cure will result in a soft coating which erodes rapidly and/or does not stabilize the surface against further swelling or particle raising. Generally 10 minutes at 300–350° F. has been found satisfactory.

It has been found that such resin stabilized surfaces, when painted with conventional paints of the oil, oil-alkyd or exterior latex types, will hold paint well and that the painted particleboard will weather with no more than the usual chalking, etc. which commonly occurs with such paints.

It has further been found that an aluminum pigment may be incorporated in the impregnating resin (providing the pH of the resin is low enough not to cause any appreciable amount of reaction with the aluminum pigment) in an amount between 5 and 20% by weight on the weight of the resin solution, and preferably between 10 and 15%, to provide a coating of exceptional weatherability. The pigmented coating may be used as a single coat, in which case the degree of particle raising is generally limited, or, if a heavy particle raise is desired, may be used in a two coat system in which a non-pigmented resin is used to promote particle raising, followed by the pigmented top-coat.

If an exceptionally smooth hard surface is desired, a single coat of the resin-aluminum mixture may be applied and dried in the usual way, after which the panel is placed in a hot press and the panel pressed for 10 minutes at 300° F. and 200 p.s.i. to cure the resin.

Stainless steel pigment may be used in place of the aluminum pigment, having the advantage of not reacting with the vehicle in alkaline resin solutions, and is particularly useful when a single coat system that will promote grain-raise is desired. Other metallic or inorganic light fast pigments may be used, providing they do not have any undesirable reaction with the phenolic vehicle. Generally, however, it appears that where other than metallic finishes are required, the use of conventional coating over the clear resin stabilized surface is preferred, due to poor color retention and/or yellowing of most pigments in the phenolic resin vehicle.

It has been found possible to obtain attractive colored metallic appearing finishes by the addition of small amounts of suitable pigments to the aluminum-resin system, which are free from most of the undesirable effects of the solid color systems.

The following are examples of processes according to the present invention.

Example I

A sample of phenolic bonded particleboard, manufactured from refined cedar shingle-hay and sawdust with 4% phenolic resin and 1.0% wax, was treated by brushing onto the surface 24 grams per square foot (53 lbs. 1000 sq. ft.) of resin A. After 5 minutes, the sample was dried in the oven at 225° F. for 10 minutes and then heated 10 minutes at 350° F. to cure the resin. The treated panel had developed a small, but uniform, particle raise on the surface.

The treated panel was next painted with one coat of an exterior acrylic latex paint and placed in an Atlas Twin Arc Weatherometer. After 3000 hours exposure in this machine, the sample showed no swelling or additional particle raising, over and above that induced by the resin treatment. The paint coat was in excellent condition, showing no cracking, blistering or peeling, and only a small amount of chalking and discoloration.

Example II

A sample of particleboard similar to that described in Example I, was treated with 35.5 grams per sq. ft. (78 lbs. 1000 sq. ft.) of resin A, to which sufficient 5 N NaOH has been added to raise the pH to 9.5. Particle raising developed rapidly and after 5 minutes the panel was dried at 220° F. for 10 minutes. A heavy, but uniform degree of particle raising on the surface of the board resulted.

A pigmented second coat was prepared from 15 grams of aluminum pigment (Bulking value .040; Leafing Power 55 on two grams; 20–25% on 325 mesh) dispersed with stirring in 100 grams of resin A (pH 8.2). The specific gravity of the aluminum-resin blend was 0.83. The second coat was brushed on the dried panel at the rate of 16 grams per sq. ft., dried 10 minutes at 220° F. and then heated for 10 minutes at 350° F. to cure the resin in both the first and second coats.

The effective pot-life of the pigmented resin was about one hour, after which evolution of hydrogen, due to reaction of the aluminum pigment with the alkaline resin, began to cause excessive foaming.

The treated panel was cut up and the following accelerated aging tests carried out:

(a) Cyclic cold soak.—A 4 inch x 8 inch sample was subjected to repeated cycles each consisting of 8 hours immersion in cold water (70° F.) followed by 16 hours drying at 145° F. After 25 cycles the coating showed no signs of failure and there was no swelling or noticeable change in the surface appearance of the board.

(b) Cyclic soak-freeze-thaw.—A 4 inch x 8 inch sample was subjected to repeated cycling, the following steps representing 1 cycle:

| Hours: | ° F. |
|---|---|
| 72 soak cold water | 70 |
| 16 freeze | 15 |
| 8 thaw | 70 |
| 24 soak | 70 |
| 16 freeze | 15 |
| 8 thaw | 70 |
| 16 dry | 145 |

After 4 cycles of the above test, the coating was in excellent condition.

(c) Weatherometer.—After 2000 hours exposure in the weatherometer, the coating was in excellent condition with no swelling or visible change in the condition of the surface.

A similar coating, but with only 5 grams aluminum per 100 grams resin in the second coat of resin (specific gravity 0.93) showed similar stability of the board to swelling and particle raise, but showed some erosion of the aluminum coating after only 10 cycles in the cold-soak and 600 hours in the weatherometer.

Example III

A sample of the same particleboard used in Example II was treated with 18 grams per sq. ft. of resin A, the pH of which has been adjusted to 9.0 with 5 N NaOH. After drying, the sample showed a degree of particle raising only slightly less than that shown by the treatment in Example II.

The sample was divided and top coats applied to each half, containing 15 and 5% aluminum respectively. After drying and curing (as in Example II), the coated panels performed in the weatherometer and accelerated aging tests in a similar manner to those in Example II.

Example IV

A sample of phenolic particleboard, having the same general composition as that used in Examples I and II was treated with 12 grams per sq. ft. of resin A (pH 8.2) and cured directly without pre-drying, at 350° F. for 5 minutes. A medium-heavy particle raise was obtained. The first coat was followed by a second coat, applied at the rate of 17 grams per sq. ft., but containing 6 grams of aluminum pigment per 100 grams of resin. The second coat was dried 15 minutes at 225° F. and the resin cured at 350° F. for 10 minutes.

A second sample of the same particleboard was given two coats of pigmented resin (6 grams of aluminum per 100 grams of resin specific gravity 0.92), each at the level of 17 grams per sq. ft., drying 10 minutes at 225° F. after each coat and then curing 10 minutes at 350° F. A medium particle raise was obtained.

The hardness of the coatings in the two samples were compared by measuring the load on a carbide-tipped needle required to produce a visible scratch.

| Sample No.: | Loading, grams |
|---|---|
| 1 | 70 |
| 2 | 80 |

Both samples were exposed in the weatherometer for 3070 hours, after which time the coating was still in excellent condition, with no change in the degree of surface particle raising.

Example V

A sample of the particleboard used in Example IV was treated with 24 grams per sq. ft. of resin A (without pigment) and cured directly at 350° F. for 15 minutes. Scratch resistance of the unpigmented coating was only 40 grams. After 723 hours exposure in the weatherometer, the surface remained free from swelling or additional particle raising, although some erosion and silvering (bleaching) of the surface fibers had occurred.

Example VI

A sample of resin A plus 8 grams of aluminum pigment per 100 grams of resin was tinted by addition of the following pigments:

| Color | Pigment Type | Amount (Grams/100 Grams Resin plus Al) |
|---|---|---|
| Blue | Ultra-marine | 2.0 |
| Yellow | Chrome Yellow (Y-433D) | 8.0 |
| Green | Chrome Green | 4.0 |

The tinted resin-aluminum mixture was applied at the rate of 16 grams per sq. ft. for each coat, dried 10 minutes at 225° F. after each coat and cured 10 minutes at 350° F. After 3070 hours exposure in the weatherometer the coatings were in good condition, presenting a colored metallic appearance, although some fading of the original colors had occurred.

Example VII

A sample of particleboard similar to that used in Example I was treated with resin B. When applied without dilution, there was little or no raising of the surface particles. When the resin was diluted to 44% solids a heavy degree particle raising was obtained. Performance of the cured resin, with pigmented top-coat containing 10% aluminum pigment in the 66% solids resin, was comparable to that obtained with resin A. The pH of the diluted resin B was 8.85. The pot-life of the pigmented resin solution was in excess of 8 hours.

Example VIII

A sample of the particle board used in Example IV was V was treated with resin C. When treated with 27 grams per sq. ft. of the undiluted resin, very little particle raising occurred. Excellent performance was obtained in the weatherometer and accelerated aging tests with a two-coat system, the second coat applied at the rate of 25 grams per sq. ft. and containing 10% aluminum pigment.

When resin C was diluted 50% with water (45% solids) a solution of pH 7.8 was obtained which produced heavy particle raising when applied at the rate 25 grams per sq. ft. The diluted resin plus 10% aluminum pigment had a useful pot-life of 8 hours while the undiluted resin plus aluminum showed very little evidence of reaction after 4 days. Performance of panels treated with the unpigmented resin plus pigmented top-coat (66 to 68% solids resin) stood up well in weatherometer and accelerated aging tests, being comparable to the other systems used.

Example IX

A sample of phenolic bonded particleboard similar to that used in Example I, was given one coat of resin A containing 10% by weight of aluminum pigment. Application was made at the rate of 27 grams per sq. ft. (60 lbs. per 1000 sq. ft.). The sample was air-dried over the week-end at room temperature, and then placed in the oven at 300° F. for 10 minutes to cure the resin. A uniform medium particle-raise was obtained which gave a pleasing surface appearance.

A parallel sample was placed in a hot-press instead of the oven and the sample pressed for 10 minutes at 300° F. and 200 p.s.i. to cure the resin. The surface particles which had been raised due to the action of the aqueous resin were re-compressed in the process and stabilized as the resin cured, resulting in a smooth hard surface.

Both samples were placed in the weatherometer and exposed for 3000 hours. At the end of this period both samples were in very good condition, although in the case of the pressed board, a small amount of particle raise was evident. However, the amount of this particle raising was only a fraction of that which would have been expected from a sample of non-stabilized board. The sample with the stabilized "raised" surface, evidenced no visible change in surface appearance.

What we claim as our invention is:

1. The process of stabilizing the surface of particleboard comprising wood particles and resin binder which comprises applying to the surface of a particleboard a water solution of water-dilutable, heat-curable phenolic resin having a low degree of polymerization and a pH from about 7.5 to about 9.5, allowing said solution to uniformly raise the surface particles of the board to a desired degree and thereby promote absorption of said resin by said particles, and subsequently drying and finally curing the applied resin to stabilize the raised surface particles against further change under varying atmospheric conditions.

2. The process of claim 1 wherein the resin binder is a phenolic resin.

3. The process of claim 1 wherein the water solution also contains a pigment.

4. The process of claim 1 wherein the water solution is at a pH of about 7.8 to 8.2 and is applied at a rate of about 53 pounds per 1000 square feet, the drying is conducted at about 225° F. for about 10 minutes, and the curing at about 350° F. for about 10 minutes.

5. The process of claim 1 wherein the water solution is at a pH of about 9.5 and is applied at a rate of about 78 pounds per 1000 square feet, the drying is conducted at a temperature of about 220° F. for about 10 minutes, and the curing at about 350° F.

6. The process of claim 1 wherein the water solution has a pH of about 9.0 and is applied at a rate of about 18 grams per square foot, the drying is conducted at about 220° F. for about 10 minutes.

7. The process of claim 1 wherein the water solution has a pH of about 8.0 to 8.2 and is applied at a rate of about 53 pounds per 1000 square feet, and the drying and curing is conducted by heating for about 15 minutes at about 350° F.

8. A particleboard having a surface of raised surface particles stabilized against further change under varying atmospheric conditions produced by the process of claim 1.

9. The process of claim 3 wherein the pigment is aluminum in an amount of about 10 percent by weight.

10. The process of stabilizing the surface of particleboard comprising wood particles and resin binder which comprises applying to the surface of a particleboard a water solution of water-dilutable, heat-curable phenolic resin having a low degree of polymerization and a pH from about 7.5 to about 9.5, allowing said solution to uniformly raise the surface particles of the board to a desired degree, and subsequently hot pressing the said particleboard to produce a hard, smooth surface thereon and simultaneously to stabilize the surface particles against change under varying atmospheric conditions.

11. The process of stabilizing the surface of particleboard comprising wood particles and resin binder which comprises applying to the surface of a particleboard a water solution of water-dilutable, heat-curable phenolic resin having a low degree of polymerization and a pH from about 7.5 to about 9.5, allowing said solution to uniformly raise the surface particles of the board to a desired degree and thereby promote absorption of said resin by said particles, drying the applied resin, applying a second coat to said surface of a water solution of a water-dilutable, heat-curable phenolic resin having a low degree of polymerization, said solution containing a pigment and having a pH from about 7.5 to about 9.5, allowing the second coat to dry and simultaneously curing the second application of resin on said surface to harden and stabilize the raised surface particles against further change under varying conditions and protecting the surface from ultra-violet light.

12. The process of claim 11 wherein the first application of said water solution has a pH of about 7.8 to 8.2 and is applied at a rate of about 12 grams per square foot, and wherein the drying and curing is conducted by heating for about 5 minutes at about 350° F.; and the second coat contains about 6 grams of aluminum pigment per 100 grams of resin and is applied at a rate of about 17 grams per square foot, the drying of said second coat being for about 15 minutes at about 225° F., and the curing being effected by heating at a temperature of about 350° F. for about 10 minutes.

13. The process of claim 10 wherein the water solution also contains a pigment.

14. The process of claim 13 wherein the pigment is aluminum in an amount of about 10 percent by weight.

References Cited

UNITED STATES PATENTS

| | | | |
|---|---|---|---|
| 2,140,981 | 12/1938 | Booty et al. | 117—148 X |
| 2,143,618 | 1/1939 | Booty et al. | 117—72 |
| 2,352,740 | 7/1944 | Shannon | 117—148 X |
| 2,352,740 | 7/1944 | Shannon | 117—148 X |
| 2,579,610 | 12/1951 | Pitre et al. | 117—161 |
| 2,983,629 | 5/1961 | Anderson | 117—148 |
| 2,983,630 | 5/1961 | Anderson | 117—148 |
| 3,267,053 | 8/1966 | Nagle et al. | 117—148 X |

WILLIAM D. MARTIN, *Primary Examiner.*

M. LUSIGNAN, *Assistant Examiner.*

U.S. Cl. X.R.

117—33.3, 71, 72, 148, 160, 161